US012674560B2

(12) United States Patent
Jhang et al.

(10) Patent No.: US 12,674,560 B2
(45) Date of Patent: Jul. 7, 2026

(54) CONTACTLESS KEY FOR PROJECTING SUSPENDED IMAGE

(71) Applicant: DARWIN PRECISIONS CORPORATION, Hsinchu County (TW)

(72) Inventors: Syuan-Wei Jhang, Hsinchu County (TW); Chih-Ping Hsu, Hsinchu County (TW); Wei Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 18/974,837

(22) Filed: Dec. 10, 2024

(65) Prior Publication Data

US 2025/0224097 A1     Jul. 10, 2025

(30) Foreign Application Priority Data

Jan. 9, 2024     (TW) ................................. 113100909

(51) Int. Cl.

| | |
|---|---|
| *F21V 11/08* | (2006.01) |
| *F21K 9/62* | (2016.01) |
| *F21V 7/00* | (2006.01) |
| *F21Y 105/10* | (2016.01) |
| G06F 3/042 | (2006.01) |
| G06F 3/044 | (2006.01) |

(52) U.S. Cl.
CPC ................ *F21V 11/08* (2013.01); *F21V 7/00* (2013.01); *G06F 3/042* (2013.01); *G06F 3/044* (2013.01)

(58) Field of Classification Search
CPC ............. F21Y 2105/10; F21Y 2105/12; F21Y 2105/14; F21Y 2105/16; F21K 9/62; F21V 11/08; F21V 11/10; F21V 11/12; F21V 11/14; F21V 7/0083
See application file for complete search history.

(56) References Cited

U.S. PATENT DOCUMENTS

2025/0102724 A1 *   3/2025   Hashida .................... G06F 3/02

FOREIGN PATENT DOCUMENTS

| CN | 209344073 U | 9/2019 |
|---|---|---|
| CN | 217875539 U | 11/2022 |
| TW | I533605 B | 5/2016 |
| TW | 202131070 A | 8/2021 |
| TW | I770949 B | 7/2022 |

* cited by examiner

*Primary Examiner* — Sean P Gramling

(57)     ABSTRACT

A contactless key is provided, including a substrate, a plurality of light-emitting elements, a light-blocking element, and an imaging film. The light-emitting elements are fixed to the substrate. The light-blocking element is fixed to the substrate. The light-blocking element has a plurality of accommodating spaces, a first surface, and a second surface. The first surface is opposite the second surface, and the first surface has a plurality of light outlets. The accommodating spaces penetrate through the first surface and the second surface and communicate with each other via the light outlets. The light-emitting elements are respectively located in the accommodating spaces. The imaging film is opposite the first surface.

10 Claims, 3 Drawing Sheets

100

100

100a

100b

CONTACTLESS KEY FOR PROJECTING SUSPENDED IMAGE

FIELD OF THE INVENTION

The present invention relates to a key, and in particular to a contactless key for projecting a suspended image.

BACKGROUND OF THE INVENTION

The common types of keys can generally be divided into contact keys and contactless keys. The contact key needs to be pressed or touched to actuate, and therefore compared with the contactless key, the contact key is often more prone to wear and tear and also difficult to keep clean. The contactless key is typically equipped with a plurality of light-emitting elements and an imaging film to project a suspended image.

Similar to the contact key, the contactless keys with different functions typically are adjacent to each other, avoiding occupying a large space. However, because the contactless keys are too close to each other, the light rays emitted by the light-emitting elements of the different contactless keys are likely to interfere with each other. Therefore, in the well-known art, the suspended image of the closed contactless keys often cannot disappear completely, causing a user to mistakenly touch them. In addition, the suspended image of well-known contactless keys also has problems such as insufficient brightness and contrast, resulting in poor image quality.

SUMMARY OF THE INVENTION

The present invention provides a contactless key for projecting a suspended image to alleviate the problem that the suspended image cannot disappear completely and improve the image quality.

To achieve one or a portion of or all of the objectives or other objectives, the contactless key for projecting a suspended image provided by the present invention includes a substrate, a plurality of light-emitting elements, a light-blocking element, and an imaging film. The light-emitting elements are fixed on the substrate. The light-blocking element is fixed on the substrate. The light-blocking element has a plurality of accommodating spaces, a first surface, and a second surface. The first surface is opposite to the second surface, and the first surface has a plurality of light outlets. The accommodating spaces penetrate through the first surface and the second surface and are respectively communicated with the light outlets. The light-emitting elements are respectively located in the accommodating spaces. The imaging film is opposite the first surface.

In an embodiment of the present invention, the light-blocking element may include a plurality of light-blocking walls. The first surface and the second surface are located at two opposite tail ends of the light-blocking wall. The light-blocking walls interlace each other and surround the accommodating spaces, and the light-blocking walls are tightly connected to each other.

In an embodiment of the present invention, the light-blocking walls are, for example, integrated or separated.

In an embodiment of the present invention, the light-blocking walls each have two light-reflective surfaces. The two tail ends of each of the light-blocking walls include a top-end and a bottom-end. The first surface is located at the top-ends, and the second surface is located at the bottom-ends. The two light-reflective surfaces are opposite to each other and located between the top-end and the bottom-end, and the two light-reflective surfaces are located in the accommodating space.

In an embodiment of the present invention, the light-blocking walls each have a width, and the width is between the two light-reflective surfaces. The width gradually increases from the top-end to the bottom-end.

In an embodiment of the present invention, the second surface at the bottom-end includes a plane, and the two light-reflective surfaces are inclined relative to the plane.

In an embodiment of the present invention, the two light-reflective surfaces each include a concave curved surface.

In an embodiment of the present invention, the light-blocking walls each may include a body and a light reflective layer. The top-end and the bottom-end are located on two opposite sides of the body. The light reflective layer is disposed at a part of the body between the top-end and the bottom-end to form the two light-reflective surfaces. The body and the light reflective layer are, for example, integrated or separated.

In an embodiment of the present invention, the light-blocking element may further include a frame. The frame surrounds and is tightly connected to the light-blocking walls.

In an embodiment of the present invention, the first surface includes, for example, a plane.

In an embodiment of the present invention, the aforementioned contactless key may further include a lens layer. The lens layer is disposed on a side of the imaging film back away from the substrate.

In an embodiment of the present invention, the contactless key may further include a suspended touch layer. The suspended touch layer is disposed on a side of the lens layer back away from the imaging film.

In the present invention, the light-emitting element of the contactless key is disposed in the accommodating space of the light-blocking element. Therefore, the light rays generated by the light-emitting elements in different accommodating spaces are blocked by the light-blocking element, and are not incident into the adjacent accommodating spaces but all projected through the light outlets onto the imaging film. Based on the foregoing description, the contactless key of the present invention can not only alleviate the problem that the suspended image cannot disappear completely but also increase the brightness of the light incident onto the imaging film, thus improving the image quality.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
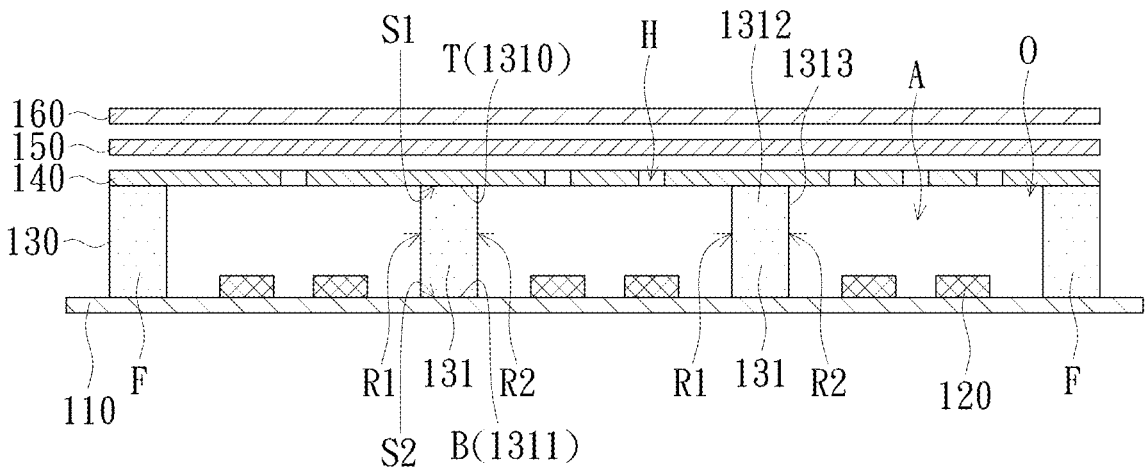
FIG. 1 is a schematic cross-sectional view of a contactless key for projecting a suspended image according to an embodiment of the present invention.
Figure 2:
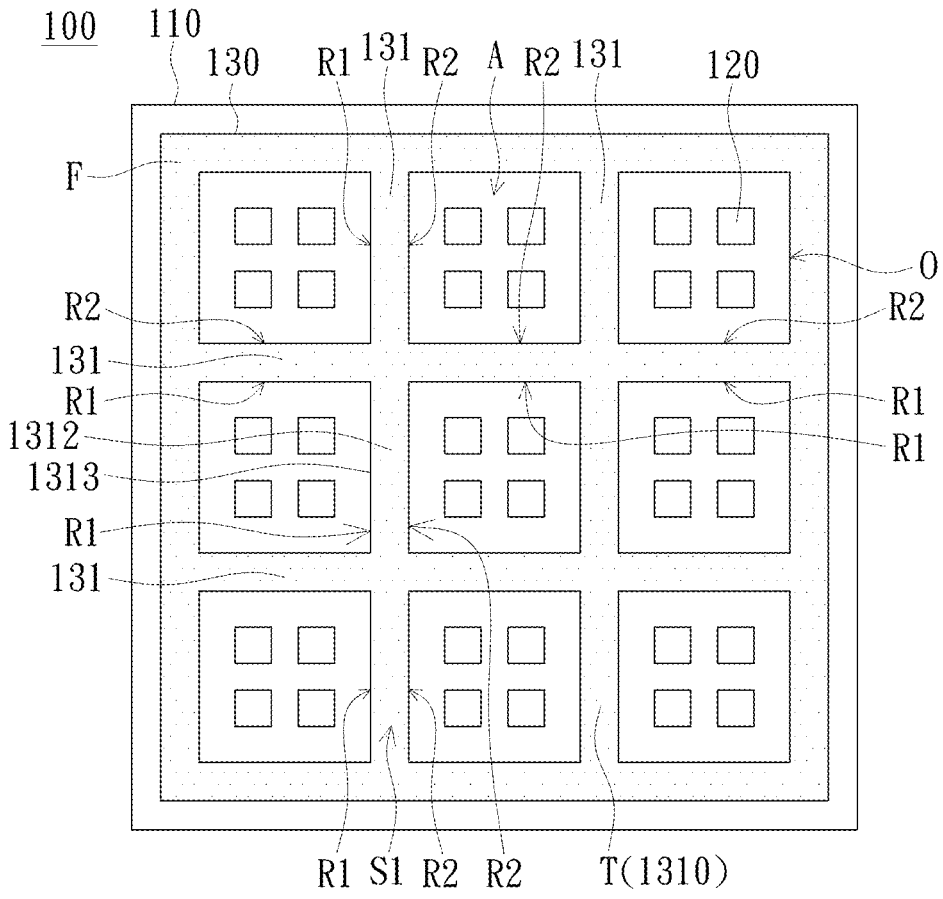
FIG. 2 is a schematic top view of a substrate, light-emitting elements, and a light-blocking element of the contactless key in FIG. 1.

FIG. 1 is a schematic cross-sectional view of a contactless key for projecting a suspended image according to an embodiment of the present invention. FIG. 2 is a schematic top view of a substrate, light-emitting elements, and a light-blocking element of the contactless key in FIG. 1. Referring to FIGS. 1 and 2, a contactless key 100 for projecting a suspended image includes a substrate 110, a plurality of light-emitting elements 120, a light-blocking element 130, and an imaging film 140. The light-emitting elements 120 are fixed on the substrate 110. The light-blocking element 130 is fixed on the substrate 110. The light-blocking element 130 has a plurality of accommodating spaces A, a first surface S1, and a second surface S2. The first surface S1 is opposite to the second surface S2, and the first surface S1 has a plurality of light outlets O. The accommodating spaces A penetrate through the first surface S1 and the second surface S2 and respectively communicate the light outlets O. The light-emitting elements 120 are respectively located in the accommodating spaces A. The imaging film 140 is disposed opposite the first surface S1. For ease of description, the "contactless key 100 for projecting a suspended image" is referred to as a contactless key 100.

The substrate 110 may include a circuit board. Specifically, the circuit board may include a printed circuit board, where the printed circuit board may include a single-layer printed circuit board (single-layer PCB), a double-layer printed circuit board (double-layer PCB), and a multi-layer printed circuit board (multi-layer PCB). However, the present invention is not limited thereto.

In this embodiment, the light-emitting element 120 may be electrically connected to the circuit board. The light-emitting element 120 includes, for example, a light-emitting diode, but other embodiments are not limited thereto. In this embodiment, each accommodating space A may be provided with four light-emitting elements 120, but the present invention is not limited thereto.

In this embodiment, the light-blocking element 130 may be made of a material with zero light transmittance. Thus, the light rays generated by the light-emitting elements 120 in different accommodating spaces A can be prevented from being incident into the adjacent accommodating spaces A, thereby ensuring that all the light rays are projected through the light outlets O. The light-blocking element 130 may include a plurality of light-blocking walls, and four light-blocking walls 131 are used as an example in this embodiment. The first surface S1 and the second surface S2 are located at two opposite tail ends 1310 and 1311 of the light-blocking wall 131. The light-blocking walls 131 interlace each other and surround the accommodating spaces A, and the light-blocking walls 131 are tightly connected to each other. This can prevent the light rays generated by the light-emitting elements 120 in different accommodating spaces A from being incident into the adjacent accommodating spaces A, thus ensuring that all the light rays are projected through the light outlets O. It should be noted that the tight connection indicates that the light ray cannot be incident into an adjacent accommodating space A through a connection joint between the light-blocking walls 131. For example, the four light-blocking walls 131 in this embodiment may be integrated. This can not only prevent the light ray from being incident into the adjacent accommodating space A through a connection joint between the light-blocking walls 131 but also allow for easier assembly of the contactless key 100. In addition, the four light-blocking walls 131 may be made through an integration process, but this is not excessively limited by the present invention. In this embodiment, the first surface S1 may be close to the imaging film 140, and the second surface S2 may be close to the substrate 110, to further prevent the light leak. Further, the first surface S1 includes, for example, a plane, such that the imaging film 140 is closer to the first surface S1.

Each light-blocking wall 131 may have light-reflective surfaces R1 and R2. A tail end 1310 of each light-blocking wall 131 includes a top-end T, and a tail end 1311 of each light-blocking wall 131 includes a bottom-end B. The first surface S1 is located at the top-ends T, and the second surface S2 is located at the bottom-ends B. The light-reflective surfaces R1 and R2 are opposite to each other and located between the top-end T and the bottom-end B and also in the accommodating space A. Therefore, each light-blocking wall 131 can reflect more light rays to the light outlets O, thus improving the light utilization efficiency. Specifically, each light-blocking wall 131 may include a body 1312 and a light reflective layer 1313. The top-end T and the bottom-end B are located on two opposite sides of the body 1312. The light reflective layer 1313 is disposed at a part of the body 1312 between the top-end T and the bottom-end B to form the two light-reflective surfaces R1 and R2. The body 1312 and the light reflective layer 1313 may be integrated. For example, a light reflective material can form four light-blocking walls 131 through the integration process. In this case, the body 1312 and the light reflective layer 1313 are integrated. The light reflective material includes, for example, metal or plastics, but this is not excessively limited by the present invention. It should be noted that in this embodiment, reflective surfaces R1 and R2 of the light-blocking wall 131 surround the accommodating space A to improve the light utilization efficiency.

The light-blocking element 130 may further include a frame F. The frame F surrounds and is tightly connected to each light-blocking wall 131, to prevent light leak at a connection joint between the frame F and each light-blocking wall 131. Similarly, the frame F and each light-blocking wall 131 can be integrated, to further prevent the foregoing light leak problem. Other features of the frame F are substantially the same as those of the light-blocking wall 131 and therefore, relevant description is omitted herein. In addition, the frame F can surround all the accommodating spaces A and the light outlets O. In addition, the first surface S1 and the second surface S2 can extend to the frame F from each light-blocking wall 131. In other words, the substrate 110 and the imaging film 140 can be both close to each light-blocking wall 131 and the frame F, which is not excessively limited by the present invention.

Still referring to FIG. 1, in this embodiment, the imaging film 140 has, for example, a plurality of imaging holes H for the light rays generated by the light-emitting elements 120 to pass through, thus forming a suspended image. It can be understood that a region of the imaging film 140 corresponding to a different accommodating space A may have an imaging hole H in a different shape to show a suspended image in a different shape.

As compared with the well-known art, in this embodiment, the light-emitting element 120 of the contactless key 100 is disposed in the accommodating space A of the light-blocking element 130. Therefore, the light rays generated by the light-emitting elements 120 in different accommodating spaces A are blocked by the light-blocking element 130, and are not incident into the adjacent accommodating spaces A but all projected through the light outlets O onto the imaging film 140. Based on the foregoing description, the contactless key 100 of this embodiment can not only alleviate the problem that the suspended image cannot disappear completely but also increase the brightness of the light incident onto the imaging film 140, thus improving the image quality.

In addition, the contactless key 100 may further include a lens layer 150. The lens layer 150 is disposed on a side of the imaging film 140 back away from the substrate 110, enabling the light rays passing through the imaging film 140 to be projected into a suspended image. In this embodiment, the lens layer 150 includes, for example, a micro lens array (MLA), but the present invention is not limited thereto.

In addition, the contactless key 100 may further include a suspended touch layer 160. The suspended touch layer 160 is disposed on a side of the lens layer 150 back away from the imaging film 140 to provide a suspended touch function. For example, the suspended touch layer 160 may include a capacitive control layer. However, in an embodiment, the contactless key 100 can provide the suspended touch function using an infrared signal transceiver. The present invention does not excessively limit the specific manner of providing the suspended touch function.

Figure 3:
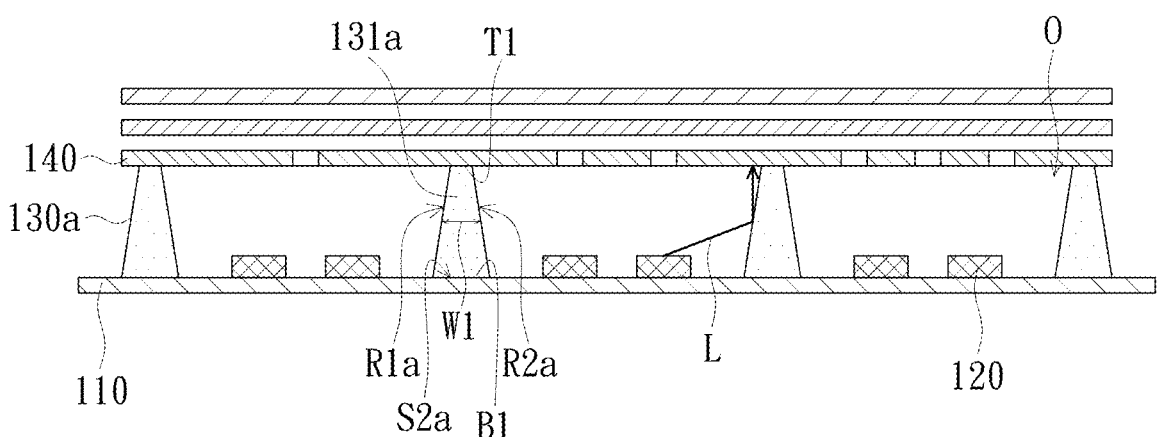
FIG. 3 is a schematic cross-sectional view of a contactless key for projecting a suspended image according to another embodiment of the present invention.

FIG. 3 is a schematic cross-sectional view of a contactless key for projecting a suspended image according to another embodiment of the present invention. The structure and advantages of a contactless key 100a in this embodiment are similar to those in the embodiment in FIG. 1, and the following describes only the difference. Referring to FIG. 3, the light-blocking walls 131a of the light-blocking element 130a each have a width W1, and the width W1 is between the two light-reflective surfaces R1a and R2a. For example, the width W1 gradually increases from a top-end T1 to a bottom-end B1. In this way, the light rays L incident onto the imaging film 140 through the light outlets O can be more collimated, further improving the brightness and contrast of the suspended image. For example, a second surface S2a at the bottom-end B1 includes a plane, and the light-reflective surfaces R1a and R2a may incline with respect to the plane to enable the width W1 to gradually increase from the top-end T1 to the bottom-end B1. In this embodiment, the second surface S2a is, for example, close to the plane of the substrate 110, and the light-reflective surfaces R1a and R2a incline with respect to the second surface S2a.

Figure 4:
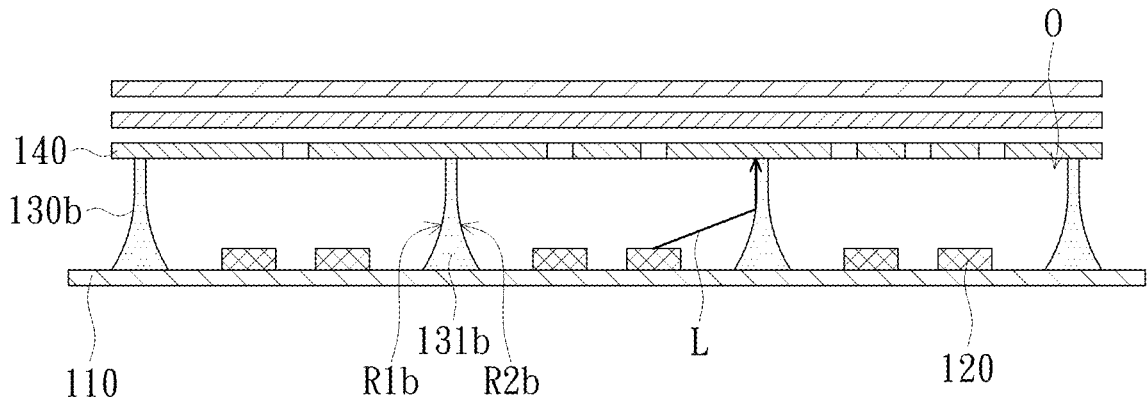
FIG. 4 is a schematic cross-sectional view of a contactless key for projecting a suspended image according to another embodiment of the present invention.

FIG. 4 is a schematic cross-sectional view of a contactless key for projecting a suspended image according to another embodiment of the present invention. The structure and advantages of a contactless key 100b in this embodiment are similar to those in the embodiment in FIG. 3, and the following describes only the difference. Referring to a light-blocking element 130b in FIG. 4, light-reflective surfaces R1b and R2b of the light-blocking wall 131b each include a concave curved surface, enabling the light rays L incident onto the imaging film 140 through the light outlets O to be more collimated. In addition, the concave curved surface can further allow the light rays to be incident from the light outlets O more uniformly, thus further improving the image quality.

Figure 5:
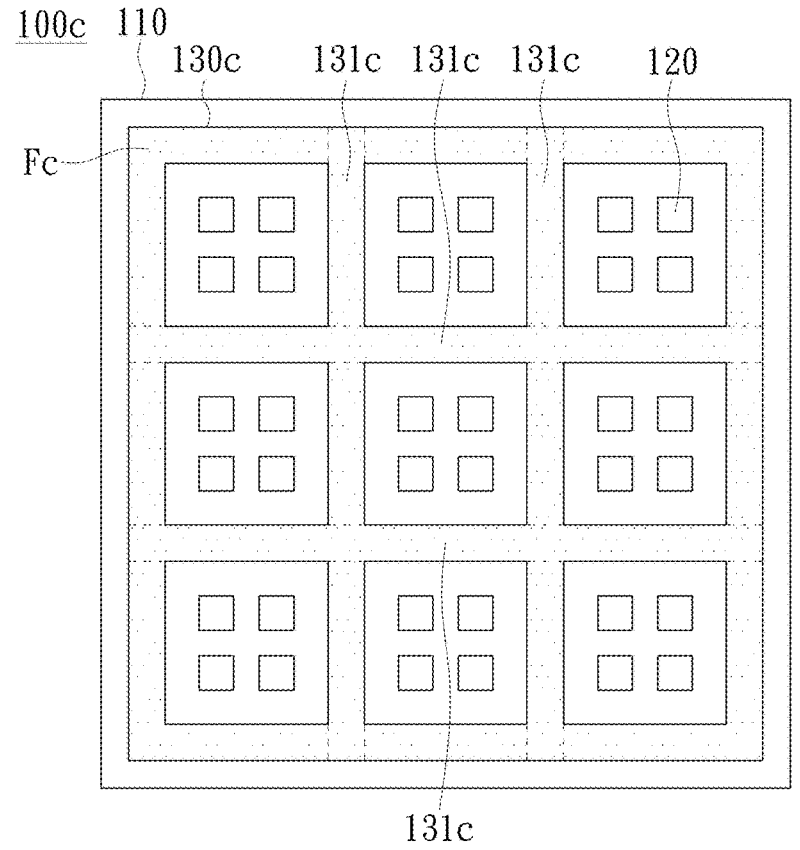
FIG. 5 is a schematic top view of a substrate, light-emitting elements, and a light-blocking element of a contactless key for projecting a suspended image according to another embodiment of the present invention.

FIG. 5 is a schematic top view of a substrate, light-emitting elements, and a light-blocking element of a contactless key for projecting a suspended image according to another embodiment of the present invention. The structure and advantages of a contactless key 100c in this embodiment are similar to those in the embodiment in FIG. 1, and the following describes only the difference. Referring to FIG. 5, a light-blocking wall 131c is, for example, a separate structure. Therefore, the light-blocking element 130c allows for easier configuration manner. It should be noted that snap-fitting structures (not shown in the figure) corresponding to each other may be disposed at the connection joints between the light-blocking walls 131c, enabling the light-blocking walls 131c to be tightly connected to each other. For example, the snap-fitting structures may include a groove and a protruding block that match each other in shape, but this is not excessively limited by the present invention. In addition, in this embodiment, a frame Fc and each light-blocking wall 131c may be separated. The assembly manner between the frame Fc and each light-blocking wall 131c is substantially the same as the assembly manner between the light-blocking walls 131c, and therefore, relevant description is omitted herein. In an embodiment, the frame Fc may be a housing (not shown in the figure) of the contactless key 100c, but the present invention does not excessively limit the specific features of the frame Fc.

Figure 6:
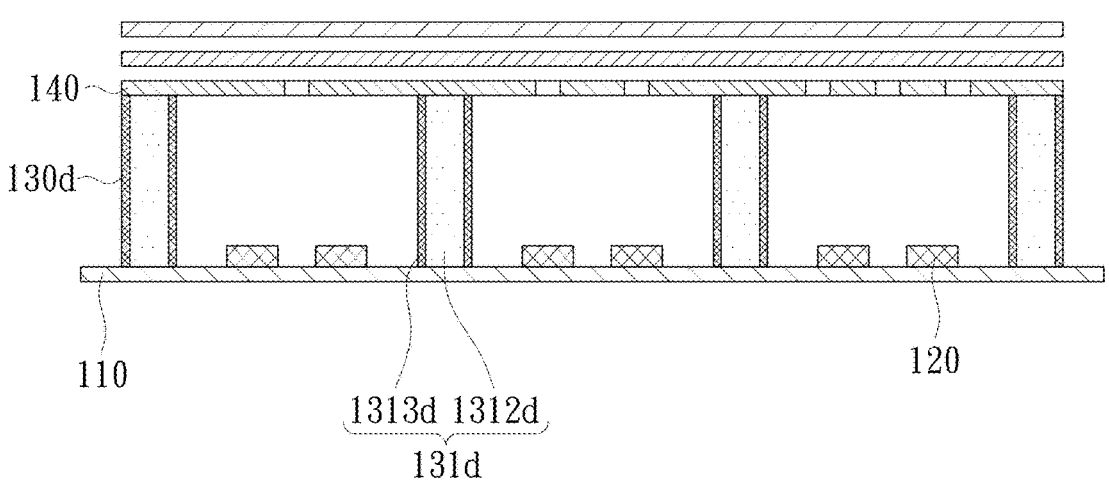
FIG. 6 is a schematic cross-sectional view of a contactless key for projecting a suspended image according to another embodiment of the present invention.

FIG. 6 is a schematic cross-sectional view of a contactless key for projecting a suspended image according to another embodiment of the present invention. The structure and advantages of a contactless key 100d in this embodiment are similar to those in the embodiment in FIG. 1, and the following describes only the difference. Referring to FIG. 6, a body 1312d and a light reflective layer 1313d are, for example, separated. Specifically, in the process of manufacturing the light-blocking element 130d, the body 1312d can be formed first, and then the light reflective layer 1313d is provided on the outer surface of the body 1312d. In this embodiment, a material of the light reflective layer 1313d may include metal, but the present invention is not limited thereto.

In summary, in the present invention, the light-emitting element of the contactless key is disposed in the accommodating space of the light-blocking element. Therefore, the light rays generated by the light-emitting elements in different accommodating spaces are blocked by the light-blocking element and are not incident into the adjacent accommodating spaces but all projected through the light outlets onto the imaging film. Based on the foregoing description, the contactless key of the present invention can not only alleviate the problem that the suspended image cannot disappear completely but also increase the brightness of the light incident onto the imaging film, thus improving the image quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A contactless key for projecting a suspended image, the contactless key consisting of a substrate;

a plurality of light-emitting elements, fixed on the substrate;

a light-blocking element, fixed on the substrate, wherein the light-blocking element has a plurality of accommodating spaces, a first surface, and a second surface, the first surface is opposite to the second surface, the first surface has a plurality of light outlets, the accommodating spaces penetrate through the first surface and the second surface and are respectively communicated with the light outlets, and the light-emitting elements are respectively located in the accommodating spaces; and an imaging film, disposed opposite the first surface;

wherein the light-blocking element comprises a plurality of light-blocking walls, the first surface and the second surface are respectively located at two opposite tail ends of the light-blocking walls, the light-blocking walls interlace each other and surround the accommodating spaces;

the contactless key for projecting a suspended image further comprising a lens layer, wherein the lens layer is disposed on a side of the imaging film back away from the substrate;

the contactless key for projecting a suspended image further comprising a suspended touch layer, wherein the suspended touch layer is disposed on a side of the lens layer back away from the imaging film.

2. The contactless key for projecting a suspended image according to claim 1, wherein the light-blocking walls are tightly connected to each other.

3. The contactless key for projecting a suspended image according to claim 2, wherein the light-blocking walls are integrated or separated.

4. The contactless key for projecting a suspended image according to claim 2, wherein the light-blocking walls each have two light-reflective surfaces, the two tail ends of each of the light-blocking walls comprise a top-end and a bottom-end, the first surface is located at the top-ends, the second surface is located at the bottom-ends, the two light-reflective surfaces are opposite to each other and located between the top-end and the bottom-end, and the two light-reflective surfaces are located in the accommodating space.

5. The contactless key for projecting a suspended image according to claim 4, wherein the light-blocking walls each have a width, the width is between the two light-reflective surfaces, and the width gradually increases from the top-end to the bottom-end.

6. The contactless key for projecting a suspended image according to claim 5, wherein the second surface at the bottom-end comprises a plane, and the two light-reflective surfaces are inclined relative to the plane.

7. The contactless key for projecting a suspended image according to claim 5, wherein the two light-reflective surfaces each comprise a concave curved surface.

8. The contactless key for projecting a suspended image according to claim 4, wherein the light-blocking walls each comprise a body and a light reflective layer, the top-end and the bottom-end are respectively located at two opposite sides of the body, the light reflective layer is disposed at part of the body between the top-end and the bottom-end to form the two light-reflective surfaces, and the body and the light reflective layer are integrated or separated.

9. The contactless key for projecting a suspended image according to claim 2, wherein the light-blocking element further comprises a frame, and the frame surrounds and is tightly connected to the light-blocking walls.

10. The contactless key for projecting a suspended image according to claim 1, wherein the first surface comprises a plane.

* * * * *